Jan. 8, 1924.

F. C. KIRCHHOFF

ICE CREAM SCOOP

Filed July 21, 1922

1,480,398

INVENTOR
F. C. KIRCHHOFF
BY
ATT'YS

Patented Jan. 8, 1924.

1,480,398

UNITED STATES PATENT OFFICE.

FREDERICK C. KIRCHHOFF, OF SAN FRANCISCO, CALIFORNIA.

ICE-CREAM SCOOP.

Application filed July 21, 1922. Serial No. 576,497.

*To all whom it may concern:*

Be it known that I, FREDERICK C. KIRCHHOFF, a citizen of the United States, residing at San Francisco, in the county of San Francisco and State of California, have invented new and useful Improvements in Ice-Cream Scoops, of which the following is a specification.

This invention relates to improvements in ice cream service devices such as scoops for dishing up ice cream and the like and has particular reference to an improved scoop which may be operated with greater ease and facility than the ordinary type of scoop, wherein a scraping action is necessary in order to scoop up the ice cream.

An object of the invention is to provide a scoop of the character described by means of which ice cream may be effectively scooped in given quantities without necessitating that a scraping action be effected, it only being necessary to push the scoop member directly into the ice cream and operate a lever member in order to effectively pick up a given quantity of ice cream, the release of the operating member automatically causing the scooped up quantity of ice cream to be discharged from the scoop.

Another object of the invention is to provide a scoop of the character described which will be simple in construction, inexpensive and so arranged that with but a single scooping operation, a given quantity of ice cream will be lifted up, thus eliminating the several scraping operations which are usually required in using the ordinary scoop.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawing.

Figure 2:
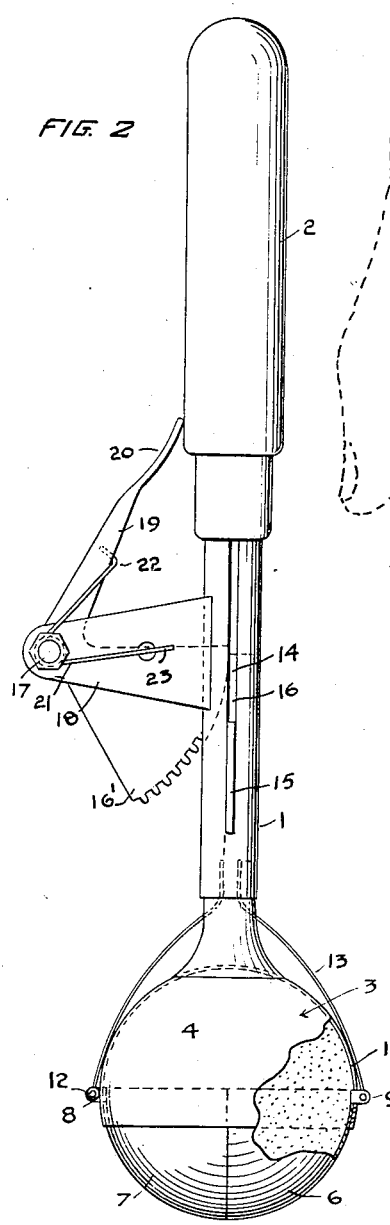
Fig. 2 is a side elevation of the scoop showing the arrangement thereof as when operated and containing a given quantity of ice cream, the scoop being broken away.
Figure 3:
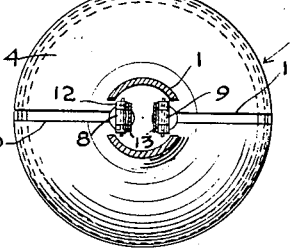
Fig. 3 represents a cross sectional view on line 3—3 of Fig. 1.
Figure 4:
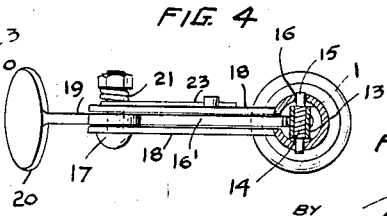
Fig. 4 represents a cross sectional view on line 4—4 of Fig. 1.

Referring to the drawing in which there is illustrated one practical embodiment of the invention, 1 designates a tubular handle having at its outer end a grip portion 2 and carrying at its lower end the scoop mechanism 3, of my invention. The scoop member 3 comprises a thin metallic substantially semi-spherical body member 4, which is slightly larger than actually half of the sphere and to the outer side of which the handle 1 is connected. The handle is welded or otherwise secured to the body member 4, so as to extend axially from said body member, or better, is extended in an upright position from the uppermost side of said member instead of being extended from the side of the member as is customary in the ordinary scoop. Pivoted as at 5 within the body member 4 are scoop segments 6 and 7, which are arranged so that they may lie wholly within the body member 4 and can be extended so as to form with the member 4, a hollow spherical container, the latter as shown in Fig. 2. The members 6 and 7 are each provided with projections or lugs 8 and 9, which lugs or projections extend through and are slidable in slots 10 formed in the body member 4. The handle 1 is flared outwardly where connected with the member 4 and is slotted on opposite sides, as at 11, the slots 11 alining with the slots 10 whereby the lugs 8 and 9 may extend into and out of the handle during the operation of the device.

As a means for operating the scoop segments 6 and 7, the lugs 8 and 9 have hingedly connected thereon in any suitable manner as at 12, resilient members 13 in the nature of leaf springs. These members extend into the tubular handle and are suitably rigidly connected at their upper ends with a rack bar 14. The rack bar 14 is provided on opposite sides with guide members 15 which engage in slots 16 formed in opposite sides of the tubular handle 1. A toothed segment 16' is pivoted as at 17 upon a lateral extension 18 fixed to the handle, and said segment meshes with the rack bar. An operating lever 19 is carried by the segment adjacent its pivoted end and is provided at its outer end with an enlarged thumb piece 20. A spring 21 surrounds the pivot member 17 and its ends 22 and 23 engage the lever 19 and projection 18 respectively, in such manner as to normally hold the lever in extended position, whereby the segments 6 and 7 will be maintained in retracted position within the body member 4.

Figure 1:
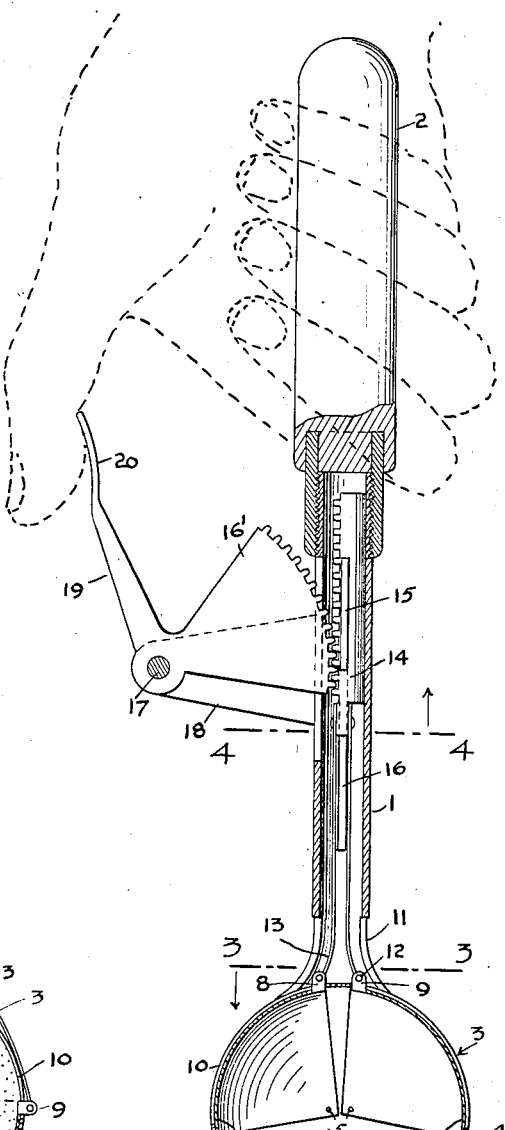
Fig. 1 represents a vertical sectional view of the scoop of my invention showing the handle in side elevation and the parts of the mechanism in position to be operated.

In the operation of the scoop, the operator grasps the handle as shown in Fig. 1, and placing the thumb on the thumb piece 20 of the lever 19, as shown in said figure, pushes the scoop forcibly into the bulk or body of ice cream to be dished or served. The sharp edges of the body member 4 will permit the said body member to be pushed downwardly into the ice cream until said member is substantially full. The operator then presses inwardly on the lever 19 so that the segment 16 will cause the rack 14 to be pushed downwardly. This movement of the rack causes the resilient members 13 to be pushed downwardly and out through the slots 11 in the handle so that the segments 6 and 7 will be moved on their pivots after the manner of a scoop, and thereby scoop up the ice cream. The members 6 and 7 are thus moved until their lower edges meet and form with the body member 4, a hollow spherical container encompassing the ice cream that is scooped. The members 13 in being resilient will follow the curve of the body member 4 and bend or flex so that the force of the operating means is transmitted thereto without appreciable loss of energy. These members 13 will closely conform to the curve of the member 4 and will not project appreciably from the sides thereof, except near the upper side of the member 4, as shown in Fig. 2. Upon releasing of the operating lever 19 the spring 21 will expand and move said lever, segment 19, rack bar 14, members 13 and segments 6 and 7 back into retracted or normal position. This movement of the members 6 and 7 will cause the ice cream to be discharged or released whereby the dishing or serving of the ice cream may be readily effected. The rear edges of the segments 6 and 7, when said members move back into normal position, will act to scrape the ice cream away from the inner wall of the member 4 and in this way effect the discharge of the ice cream from the scoop.

With the device of my invention it will be seen that it is unnecessary for the operator to effect several scraping actions to scoop up the desired quantity of ice cream. With my invention it is only necessary to push the scoop downwardly into the bulk of the ice cream and then operate the lever 19 and withdraw the scoop from the freezer or ice cream container. In this way it will be seen that a great deal of time may be saved and less energy need be expended to effectively scoop out a given quantity of ice cream from the freezer or container.

I claim:

1. An ice cream scoop comprising a substantially semi-spherical body member, a handle fixed to and extending axially from said member, scoop segments pivoted within the body member and adapted when extended to form with the said body member, a hollow spherical container and means associated with the handle for moving the said segments into and out of the body member.

2. An ice cream scoop comprising a substantially semi-spherical body member, a handle fixed to and extending axially from said member, scoop segments pivoted within the body member and adapted when extended to form with the said body member, a hollow spherical container, means associated with the handle for moving the said segments into and out of the body member, which means comprises a rack bar slidable upon the handle, a pivoted segment mounted on the handle and engaging the rack bar, an operating lever fixed to the segment and resilient members fixed to the rack bar and hingedly connected with the segments.

FREDERICK C. KIRCHHOFF.